Patented July 1, 1941

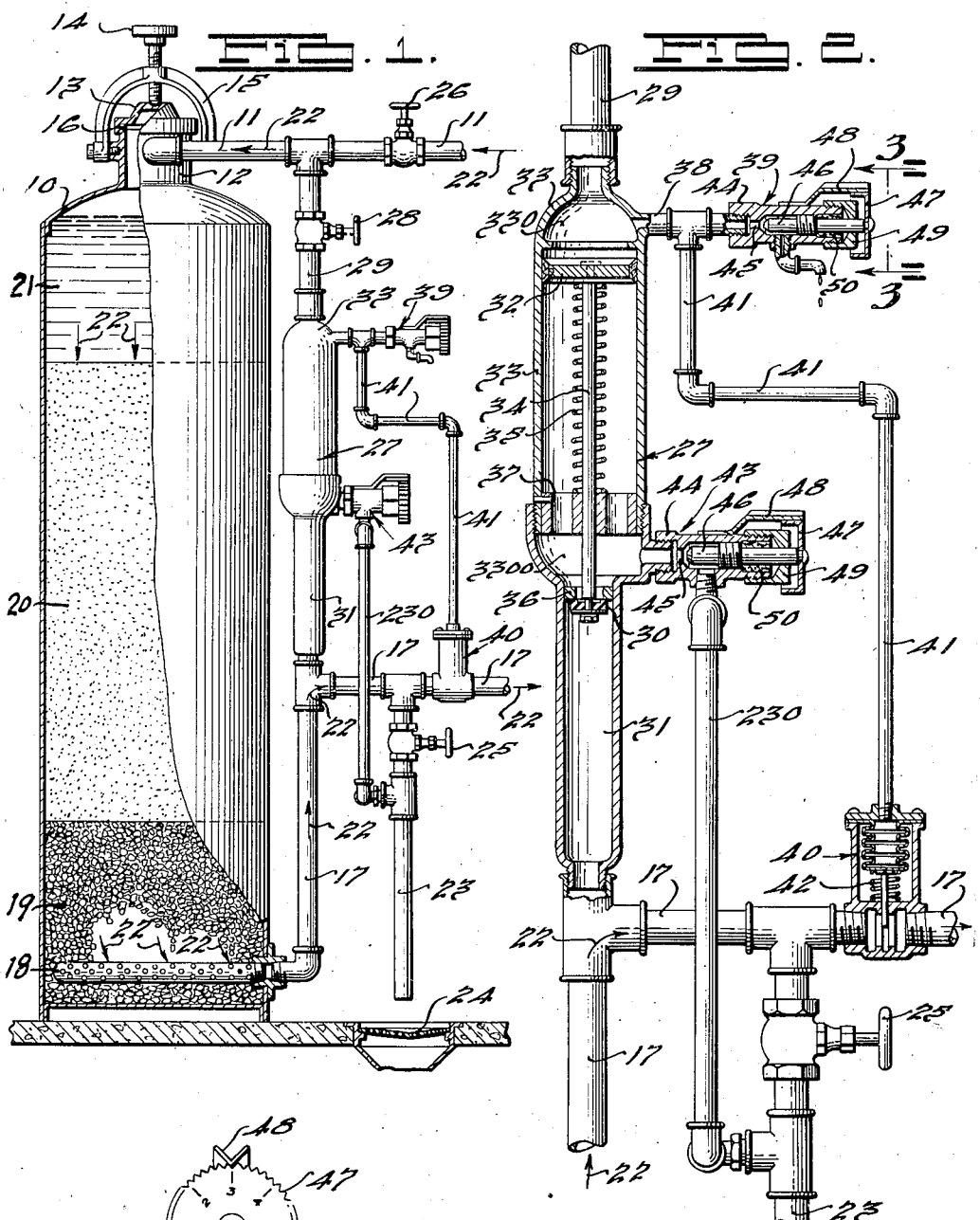

2,247,964

UNITED STATES PATENT OFFICE 2,247,964

WATER SOFTENER

Earl C. Reynolds, Detroit, Mich.

Application April 25, 1939, Serial No. 269,966

6 Claims. (Cl. 210—24)

This invention relates to water softeners and in particular to a novel method and means for controlling the regeneration of the water softening means employed.

In single tank type water softening apparatus water softening means such as zeolite crystals are employed which give up sodium and take on calcium as hard water passes through the water softener. After the chemical exchange activity of the zeolite crystals is exhausted, it becomes necessary to regenerate the said crystals by passing a brine solution thereover which causes the said crystals to give up calcium and take on sodium. When sufficient brine has passed over the zeolite crystals to cause them to return to their normal chemical state and after the brine has been completely flushed from the water softener, the regeneration cycle is complete and the water softener is again placed into service.

It requires 30 minutes or more to regenerate water softening means such as zeolite crystals in a single tank type water softening apparatus. The home owner who does not desire to be bothered with the frequent and time consuming operation of regenerating a water softener is either obliged to purchase an expensive fully automatic or semi-automatic water softener or resort to the rental of water softeners under terms which include service calls at regular intervals by a service man to regenerate the water softener. In certain localities the installation and servicing of water softeners on a monthly rental and service charge basis is in demand. To be profitable and to give satisfactory service to a customer, semi-automatic water softener equipment which is inexpensive, which operates positively and accurately, and which prevents brine used for regeneration from entering the piping to household fixtures is required by water softener rental companies.

There have been a number of semi-automatic single tank water softeners available for sale or installation on a rental basis, however, none have proven entirely satisfactory inasmuch as the timing means for shutting off the regenerating cycle employed was inaccurate, because no means was provided to balance the volume of brine passing through the water softener for the regeneration of the zeolite crystals therein with the timing means, and because the water supply to the household fixtures from the water softener was not shut off during the regeneration period which required notification of each person in a household that the water softener was being regenerated and that they should not use water from any fixture for a certain period of time.

If the water supply from a water softener to the household fixtures was shut off manually during the regeneration period, it is then necessary for a service man or a householder to wait until the regeneration cycle had been completed and then manually open the valve which had been closed during the regeneration cycle.

Also, regeneration period timing means such as valves controlled by a dissolvable ball or the like have been used in the prior art to hold a valve open for permitting brine to pass through a water softener, the said valve being permitted to close gradually during the regeneration period by the dissolving of the said ball. Such valves are not only inaccurate but fail to close quickly and completely at the termination of the regeneration cycle. Dissolvable ball type shut-off valves admit a gradually diminishing amount of water therethrough during the regeneration cycle. Obviously, when dissolvable ball control valves are employed, the regeneration cycle is approximately twice as long as necessary because the time required at the end of the regeneration cycle for flushing excess brine from the water softener is greatly increased by the valve being less than half open during the latter portion of the regeneration cycle.

With the foregoing in view, it is the object of this invention to provide a novel method and means for accurately controlling the regeneration of a water softener, to provide means for regulating the rapidity with which brine and flushing water passes through the water softener during the regeneration period, and to provide means for automatically closing off the water supply through the water softener to the household fixtures or the like connected thereto during the cycle of the regeneration of the water softener only.

Another object of the invention is to provide, in combination with a water softener, a simple, inexpensive to manufacture and readily installed apparatus for completely controlling the regeneration and flushing of the water softening means employed in a water softener which requires a manually operated hydraulic setting for changing from a water softening cycle to a regenerating cycle and which provides completely automatic return from the regenerating cycle to the water softening cycle, the said apparatus being adapted to automatically shut off the water supply from the water softener during the regenerating cycle only.

Other objects of the invention will become apparent by reference to the following detailed description taken in connection with the accompanying drawing, in which:

Fig. 1 is a view part in elevation and part in section of a single tank regenerating type water softener and the novel means employed for manually changing over the water softener from a water softening cycle to a regenerating cycle and automatically changing back to the water softening cycle.

Fig. 2 is an enlarged view part in section and part in elevation showing in detail an embodiment of apparatus employed for automatically changing a water softener from its regenerating cycle to its water softening cycle and for automatically shutting off the water supply from the water softener during the regenerating cycle only.

Fig. 3 is an elevational view of the control knob of one of the volumetric hydraulic control valves employed.

Referring now to the drawing wherein like numerals refer to like and corresponding parts throughout the several views, the invention is disclosed in combination with a suitable water softener tank 10 which is of the usual construction having a hard water inlet line 11 connected to the top thereof preferably at the neck 12. The top of the said tank 10 is closed by a cap 13 urged in sealed relationship over the annular top of the said neck 12 by a hand screw 14 threaded through a yoke 15 pivoted to the said neck 12 of the tank 10. A suitable washer 16 is employed between the annular end of the neck 12 and the cap 13 to assure a watertight joint when the cap 13 is compressed over the tank neck 12.

A soft water outlet line 17 runs from a point near the bottom of the tank 10 to household fixtures or the like to which soft water is supplied from the water softener. A perforated outlet tube 18 disposed in the water softener tank 10 across and near the bottom thereof is connected to the soft water outlet line 17 at the point where the said soft water outlet line is connected to the said tank 10. The water softener tank 10 is preferably charged first by placing a distributing bed 19 of crushed quartz or the like in the bottom thereof which assures a uniform passage of water through the water softener. The water softener tank 10 is then filled with a water softening means 20 such as zeolite crystals to a point sufficiently below the top of the tank 10 to admit of placing in the top of the said tank a suitable quantity of salt which forms a brine employed as hereinafter described to regenerate the zeolite crystal water softening means 20. In the normal operation of the water softener, the space 21 above the water softening means 20 is occupied by hard water. During the water softening cycle hard water enters the water softener tank 10 at the top thereof through the hard water inlet line 11, passes through the water softening means 20, then passes through the distributing bed 19, and out of the said water softener tank 10 through the perforated outlet tube 18 and the soft water outlet line 17 as indicated by the arrows 22 in Figs. 1 and 2. The water is forced through the water softening tank by the pressure in the hard water inlet line 11 which is generally 30 to 50 pounds per square inch.

A drain line 23 preferably running to a floor sump 24 is connected to the soft water outlet line 17. A shut-off valve 25 is provided in the said drain line 23 which is closed during the normal water softening cycle of operation of the water softener. The hard water inlet line 11 is provided with a shut-off valve 26 which is opened during the normal water softening cycle of operation of the water softener.

Hydraulic regeneration control means, generally designated by the numeral 27 in Figs. 1 and 2 and hereinafter described in detail is connected between the hard water inlet line 11 and the soft water outlet line 17 on the tank side of the shut-off valves 25 and 26 in the drain line 23 and hard water intake line 11 respectively. A regeneration control means setting valve 28 is disposed in the connecting line 29 between the said hard water intake line 11 and the hydraulic regeneration control means 27. The said regeneration control means setting valve 28 is closed during the normal water softening cycle of operation of the water softener.

The hydraulic regeneration control means generally designated by the numeral 27 in the drawing comprises a valve 30 disposed in a valve chamber 31 normally maintained in a closed position by a spring loaded piston 32 reciprocatingly mounted in a cylinder 33 connected at one end to the valve chamber 31 and at the other end to the connecting line 29 between the hydraulic control regenerating means 27 and the hard water inlet line 11. The said valve 30 is connected to the piston 32 by means of a valve stem 34 around which a compression spring 35 is positioned which constantly urges the valve 30 toward its closed position against an annular valve seat 36 disposed in the said valve chamber 31. An apertured valve stem guide 37 is preferably pressed into the end of the cylinder 33 nearest the valve chamber 31 and serves as a buttress against which the compression spring 35 reacts. The hydraulic regeneration control means 27 has its valve chamber end 31 connected to the soft water outlet line 17 and its cylinder end 33 connected to the hard water inlet line 11 by means of the said connecting line 29 which has the regeneration control means setting valve 28 disposed therein.

The cylinder 33 of the hydraulic regeneration control means 27 is provided with a time regulating outlet line 38 connected to the compression chamber 330 of the said cylinder 33, the said compression chamber 330 being located on the pressure side of the spring loaded piston 32. A suitable regulating type needle valve 39 is provided on the end of the time regulating outlet line 38 through which water under pressure from the compression chamber 330 is permitted to escape, the adjustment of the said needle valve 39 being employed to regulate the time required for the closing of the valve 30 which is connected to the said spring loaded piston 32 by a valve stem 34.

A pressure controlled soft water shut-off valve 40 preferably of a bellows operated type is placed in the soft water outlet line 17 on the household fixture side of the drain line 23 from the soft water outlet line 17. The said soft water shut-off valve 40 is closed by hydraulic pressure built up in the cylinder 33 when the spring loaded piston 32 therein is compressed. The said hydraulic pressure is preferably applied to the said soft water shut-off valve 40 through the pressure line 41, the spring 42 in the said pressure controlled soft water shut-off valve 40 being of suitable compressive strength with respect to the spring 35 of the spring loaded piston 32 to admit of the foregoing.

When the pressure controlled soft water shut-off valve 40 is closed and the compressing of the piston 32 by hydraulic pressure admitted to the compression chamber 330 of the cylinder 33 opens the valve 30, all of which occurs during the regeneration cycle of the water softener, first brine formed by salt placed in the top of the tank 10 and then, after the brine is spent, water passes through the valve chamber 31 and around the valve 30 of the hydraulic regeneration control means 27, through the annular valve seat 36, and out of the drain line 230 which is connected from the pressure free chamber 3300 of the cylinder 33 to the drain line 23 below the drain line shut-off valve 25. The said brine and water passes through the water softener during the regeneration cycle under the volumetric control of an adjustable needle valve 43 interposed between the chamber 3300 of the cylinder 33 and the drain line 230.

Thus, the volume of brine and water through the water softener may be regulated with accuracy as well as the timing of the regeneration period, all by a simple hydraulically interlocked regeneration control means automatically adapted to prevent brine and flushing water from being drawn from the water softener to household fixtures connected thereto during the regeneration period of the said water softener.

The adjustable needle valves 39 and 43 may be of the same type and are preferably constructed as illustrated in Figs. 2 and 3 wherein the valve body 44 is provided with a restricted orifice 45 opposite which a needle valve stem 46 is threaded, the said needle valve stem 46 being suitably shaped to regulate the flow of fluid through the said restricted orifice 45. A needle valve adjustment knob 47 is secured to the end of the needle valve stem 46 for rotating the latter so as to regulate the effective opening of the restricted orifice 45 and thus accurately regulate the amount of water flowing through the needle valve. A needle valve adjustment spring 48 is secured to the needle valve body 44 and cooperates with the serrated periphery of the adjustment knob 47 so as to retain the needle valve in the desired adjusted position. Any desired indicia may be marked on the face of the said needle valve adjustment knob 47 as indicated in Fig. 3. A packing nut 49 and suitable packing 50 are employed to effect a seal about the valve stem 46. In the particular embodiment of the invention disclosed in the drawing, the only difference between the needle valve 39 and the needle valve 43 is the size thereof.

During the normal water softening cycle of the novel single tank regenerating type water softener and control apparatus therefor disclosed herein, the drain valve 25 is closed, the hard water inlet line shut-off valve 26 is open, the regenerating control means setting valve 28 is closed and hard water enters the water softener tank at the top thereof through the hard water inlet line 11, passes through the water softening means 20 in the said water softening tank 10, passes through the distributing bed 19, and leaves the water softener tank 10 through the perforated outlet tube 18 and the soft water outlet line 17 as indicated by the arrows 22 in Figs. 1 and 2, the water being forced through the said water softener by pressure in the hard water inlet line 11.

After the chemical exchange activity of the water softening means 20 has become substantially exhausted, it becomes necessary to regenerate the same by passing a brine solution therethrough. Regeneration is accomplished as follows: The hard water inlet line shut-off valve 26 is closed and the drain line shut-off valve 25 is opened to permit the draining of water from the water softener tank 10. The cap 13 is then removed from the top of the soft water tank and a sufficient quantity of salt or the like is then placed in the tank to completely regenerate the water softening means 20 therein. The cap 13 is then replaced and tightly sealed by turning the hand screw 14. The drain line shut-off valve 25 is then closed. The hard water inlet line shut-off valve 26 is then opened after which the regeneration control means setting valve 28 is opened whereupon a pressure is created in the compression chamber 330 of the cylinder 33 of the hydraulic regeneration control means 27 which causes the piston 32 to move and open the valve 30. Water under pressure in the compression chamber 330 of the said cylinder 33 also travels in the pressure line 41 connected to the pressure controlled soft water shut-off valve 40, closes the said soft water shut-off valve 40 and holds the same closed during the entire regeneration period. Water under pressure in the compression chamber 330 causes the said piston 32 to travel the full length of its stroke and fully compresses the spring 35 which normally urges the said piston toward the compression chamber 330. The regeneration control means setting valve 28 is then closed.

As soon as the valve 30 of the hydraulic regeneration control means 27 is opened, first brine and then, after the brine has been spent, water passes through the valve chamber 31 of the hydraulic regeneration control means 27 and out through the drain line 230 which is connected to the drain line 23 below the drain line shut-off valve 25. The volumetric control needle valve 43 is suitably adjusted to regulate the amount of brine and then water which passes through the water softener tank 10 during the regeneration period. The compression spring 35 maintains pressure in the compression chamber 330 during the entire regeneration cycle of operation of the water softener. The duration of the regenerating cycle is controlled by the needle valve 39 which is adjusted to gradually emit water from the compression chamber 330 of the cylinder 33 whereby to permit the said piston 32 to move gradually toward the limit of its spring actuated stroke, and, when the said piston 32 has moved to the limit of its spring actuated stroke, the valve 30 becomes seated against the annular valve seat 36 and the regeneration cycle is completed. After the regeneration cycle is completed the spring 42 of the pressure controlled soft water shut-off valve 40 forces additional water through the said needle valve 39 and, when the pressure in the pressure line 41 becomes relieved, opens the said soft water shut-off valve 40 and thus automatically changes the operation of the water softener from its regeneration cycle back to its normal water softener cycle of operation.

Although but one embodiment of the invention has been disclosed and described in detail, it is obvious that many changes may be made in size, shape, arrangement and detail of the various elements of the invention without departing from the spirit thereof, and it is not intended to limit the scope of the invention other than by the terms of the appended claims.

I claim:

1. Water softening apparatus of the class described comprising a water softening tank including a hard water supply pressure line thereto and a soft water outlet line therefrom and a drain line connected to said soft water outlet, a normally closed drain shut-off valve, manual valve means for shutting off the hard water supply line, means associated with said tank through which regenerating chemical may be inserted into the said tank when said hard water supply valve is closed, normally closed regeneration cycle valve means connected to said soft water outlet including by-pass means connected from said regenerating valve means to said drain for permitting regenerating chemical and flushing water to pass through said water softening tank and through said drain by-pass to said drain when said regeneration cycle valve means is open, hydraulic means connected to said hard water supply pressure line including manually controlled valve means adapted to set the said regeneration cycle valve means from its normally closed to its open position whereupon the regeneration cycle of the water softening apparatus is initiated, spring means compressed by said hydraulic means when said regeneration cycle is initiated for closing the said regeneration cycle valve means, and means for timing the spring closing of the said regeneration cycle valve means whereby to regulate the duration of the regeneration cycle of operation of the water softening apparatus.

2. Water softening apparatus of the class described comprising a water softening tank including a hard water supply pressure line thereto and a soft water outlet line therefrom and a drain line connected to said soft water outlet, a normally closed drain shut-off valve, manual valve means for shutting off the hard water supply line, means associated with said tank through which regenerating chemical may be inserted into the said tank when said hard water supply valve is closed, normally closed regeneration cycle valve means connected to said soft water outlet including by-pass means connected from said regenerating valve means to said drain for permitting regenerating chemical and flushing water to pass through said water softening tank and through said drain by-pass to said drain when said regeneration cycle valve means is open, means for regulating the flow of regenerating chemical through said water softening tank when the said regeneration cycle valve means is open, hydraulic means connected to said hard water supply pressure line including manually controlled valve means adapted to set the said regeneration cycle valve means from its normally closed to its open position whereupon the regeneration cycle of the water softening apparatus is initiated, spring means compressed by said hydraulic means when said regeneration cycle is initiated for closing the said regeneration cycle valve means, and means for timing the spring closing of the said regeneration cycle valve means whereby to regulate the duration of the regeneration cycle of operation of the water softening apparatus.

3. Water softening apparatus of the class described comprising a water softening tank including a hard water supply pressure line thereto and a soft water outlet line therefrom and a drain line connected to said soft water outlet, a normally closed drain shut-off valve, manual valve means for shutting off the hard water supply line, means associated with said tank through which regenerating chemical may be inserted into the said tank when said hard water supply valve is closed, normally closed regeneration cycle valve means connected to said soft water outlet including by-pass means connected from said regenerating valve means to said drain for permitting regenerating chemical and flushing water to pass through said water softening tank and through said drain by-pass to said drain when said regeneration cycle valve means is open, hydraulic means connected to said hard water supply pressure line including manually controlled valve means adapted to set the said regeneration cycle valve means from its normally closed to its open position whereupon the regeneration cycle of the water softening apparatus is initiated, spring means compressed by said hydraulic means when said regeneration cycle is initiated for closing the said regeneration cycle valve means, and means for timing the spring closing of the said regeneration cycle valve means whereby to regulate the duration of the regeneration cycle of operation of the water softening apparatus, a normally open shut-off valve means for closing the soft water outlet line from the water softening apparatus including means for closing the same hydraulically responsive to the said hydraulic means employed for opening the said regeneration cycle valve means, and spring means adapted to open the said soft water shut-off valve after the said regeneration cycle valve means is re-closed.

4. Water softening apparatus of the class described comprising a water softening tank including a hard water supply pressure line thereto and a soft water outlet line therefrom and a drain line connected to said soft water outlet, a normally closed drain shut-off valve, manual valve means for shutting off the hard water supply line, means associated with said tank through which regenerating chemical may be inserted into the said tank when said hard water supply valve is closed, normally closed regeneration cycle valve means connected to said soft water outlet including by-pass means connected from said regenerating cycle valve means to said drain for permitting regenerating chemical and flushing water to pass through said water softening tank and through said drain by-pass to said drain when said regeneration cycle valve means is open, means for regulating the flow of regenerating chemical through said water softening tank when the said regeneration cycle valve means is open, hydraulic means connected to said hard water supply pressure line including manually controlled valve means adapted to set the said regeneration cycle valve means from its normally closed to its open position whereupon the regeneration cycle of the water softening apparatus is initiated, spring means compressed by said hydraulic means when said regeneration cycle is initiated for closing the said regeneration cycle valve means, and means for timing the spring closing of the said regeneration cycle valve means whereby to regulate the duration of the regeneration cycle of operation of the water softening apparatus, a normally open shut-off valve means for closing the soft water outlet line from the water softening apparatus including means for closing the same hydraulically responsive to the said hydraulic means employed for opening the said regeneration cycle valve, and spring means adapted to open the said soft water shut-off valve after the said regeneration cycle valve means is re-closed.

5. Water softening apparatus of the class described comprising a water softening tank including a hard water supply pressure line thereto and a soft water outlet line therefrom and a drain line connected to said soft water outlet, a normally closed drain shut-off valve, manual valve means for shutting off hard water supply line, means associated with said tank through which regenerating chemical may be inserted into the said tank when said hard water supply valve is closed, normally closed regeneration cycle valve means connected to said soft water outlet including by-pass means connected from said regeneration cycle valve means to said drain for permitting said regenerating chemical and flushing water to pass through said water softening tank and through said drain by-pass to said drain when said regeneration cycle valve means is open, a hydraulic cylinder and a spring loaded piston fitted therein connected to the said regeneration cycle valve means normally maintaining the said regeneration cycle valve means closed, a connecting line between said hard water supply pressure line and said cylinder including manual valve means for applying water pressure to said hydraulic cylinder whereby to compress the spring therein and open said regeneration cycle valve means, the said spring and piston applying pressure to water remaining in said cylinder when the spring loaded piston is compressed and after the manually operated regeneration cycle initiating valve means is closed, and means regulating the rate of emission of water under pressure from said cylinder after the said manually operated regeneration cycle initiating valve means is closed whereupon the duration of the regeneration cycle of operation is hydraulically timed.

6. Water softening apparatus of the class described comprising a water softening tank including a hard water supply pressure line thereto and a soft water outlet line therefrom and a drain line connected to said soft water outlet, a normally closed drain shut-off valve, manual valve means for shutting off hard water supply line, means associated with said tank through which regenerating chemical may be inserted into the said tank when said hard water supply valve is closed, normally closed regeneration cycle valve means connected to said soft water outlet including by-pass means connected from said regeneration cycle valve means to said drain for permitting said regenerating chemical and flushing water to pass through said water softening tank and through said drain by-pass to said drain when said regeneration cycle valve means is open, volumetric hydraulic control means for regulating the rate of flow of regenerating chemical and flushing water through said water softener during the regeneration cycle of operation, a hydraulic cylinder and a spring loaded piston fitted therein connected to the said regeneration cycle valve normally maintaining the said regeneration cycle valve closed, a connecting line between said hard water supply pressure line and said cylinder including manual valve means for applying water pressure to said hydraulic cylinder whereby to compress the spring therein and open said regeneration cycle valve, the said spring and piston applying pressure to water remaining in said cylinder when the spring loaded piston is compressed and after the manually operated regeneration cycle initiating valve means is closed, and means regulating the rate of emission of water under pressure from said cylinder after the said manually operated regeneration cycle initiating valve is closed whereupon the duration of the regeneration cycle of operation is hydraulically timed.

EARL C. REYNOLDS.